(12) United States Patent
Ehrensvärd et al.

(10) Patent No.: US 9,122,860 B2
(45) Date of Patent: *Sep. 1, 2015

(54) DEVICE AND METHOD FOR IDENTIFICATION AND AUTHENTICATION

(71) Applicant: Yubico Inc., Palo Alto, CA (US)

(72) Inventors: Jakob Ehrensvärd, Palo Alto, CA (US); Stina Ehrensvärd, Palo Alto, CA (US)

(73) Assignee: Yubico Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,061

(22) Filed: Jun. 19, 2014

(65) Prior Publication Data

US 2015/0012981 A1      Jan. 8, 2015

Related U.S. Application Data

(63) Continuation of application No. 12/669,929, filed as application No. PCT/EP2007/053966 on Apr. 23, 2007, now Pat. No. 8,806,586.

(60) Provisional application No. 60/745,432, filed on Apr. 24, 2006, provisional application No. 60/746,915, filed on May 10, 2006, provisional application No. 60/806,299, filed on Jun. 30, 2006.

(51) Int. Cl.
*G06F 21/00* (2013.01)
*G06F 21/34* (2013.01)
*H04L 9/32* (2006.01)

(52) U.S. Cl.
CPC .............. *G06F 21/34* (2013.01); *H04L 9/3236* (2013.01); *H04L 2209/805* (2013.01)

(58) Field of Classification Search
CPC ....................................................... G06F 21/34
USPC ....................................... 726/5; 713/168, 182
See application file for complete search history.

(56) References Cited

U.S. PATENT DOCUMENTS

| 6,374,145 B1 | 4/2002 | Lignoul |
| 6,704,824 B1 | 3/2004 | Goodman |
| 7,080,244 B2 | 7/2006 | Natu et al. |

(Continued)

FOREIGN PATENT DOCUMENTS

| EP | 1783660 A2 | 5/2007 |
| EP | 2063400 A1 | 5/2009 |

(Continued)

OTHER PUBLICATIONS

International Search Report and Written Opinion, PCT Application No. PCT/EP2012/056881, Jul. 17, 2012, 13 pages.

(Continued)

*Primary Examiner* — Mohammad A Siddiqi
(74) *Attorney, Agent, or Firm* — Fenwick & West LLP

(57) ABSTRACT

A device for identification and authentication of a remote user connecting to a service over a network includes a cryptographic processor and at least one cryptographic key and storage means, additional processing means and interface means to generate and transmit a unique authentication code as emulated keystrokes through a standard input, means of a client terminal. The code may be transmitted only by an explicit command of the user.

16 Claims, 1 Drawing Sheet

(56) References Cited

U.S. PATENT DOCUMENTS

| | | |
|---|---|---|
| 7,412,722 B1 | 8/2008 | Norris et al. |
| 8,806,586 B2 * | 8/2014 | Ehrensvärd et al. ............... 726/5 |
| 2003/0046588 A1 | 3/2003 | Gliniecki et al. |
| 2004/0075642 A1 | 4/2004 | Kisliakov |
| 2004/0111631 A1 | 6/2004 | Kocher et al. |
| 2004/0123127 A1 | 6/2004 | Teicher et al. |
| 2005/0091367 A1 * | 4/2005 | Pyhalammi et al. .......... 709/224 |
| 2005/0109841 A1 | 5/2005 | Ryan et al. |
| 2005/0182971 A1 | 8/2005 | Ong et al. |
| 2005/0193199 A1 * | 9/2005 | Asokan et al. ................ 713/168 |
| 2006/0208066 A1 | 9/2006 | Finn et al. |
| 2006/0279413 A1 | 12/2006 | Yeager |
| 2008/0192933 A1 | 8/2008 | Bertin |
| 2010/0093334 A1 | 4/2010 | Bertin et al. |
| 2010/0191951 A1 | 7/2010 | Malone et al. |
| 2012/0265988 A1 | 10/2012 | Ehrensvard |

FOREIGN PATENT DOCUMENTS

| | | | |
|---|---|---|---|
| FR | 2938094 A1 | 5/2010 | |
| JP | 2009-187502 A | 8/2009 | |
| WO | WO 00/42491 A1 | 7/2000 | |
| WO | WO 2005/050384 A2 | 6/2005 | |
| WO | WO 2007/023473 A2 | 3/2007 | |

OTHER PUBLICATIONS

PCT International Search Report, PCT Application No. PCT/EP2007/053966, Aug. 2, 2007, 2 pages.

PCT Written Opinion, PCT Application No. PCT/EP2007/053966, Aug. 2, 2007, 10 pages.

United States Office Action, U.S. Appl. No. 12/669,929, Nov. 6, 2013, 14 pages.

United States Advisory Action, U.S. Appl. No. 12/669,929, Sep. 25, 2013, 3 pages.

United States Office Action, U.S. Appl. No. 12/669,929, Jun. 5, 2013, 13 pages.

United States Office Action, U.S. Appl. No. 12/669,929, Aug. 27, 2012, 13 pages.

* cited by examiner

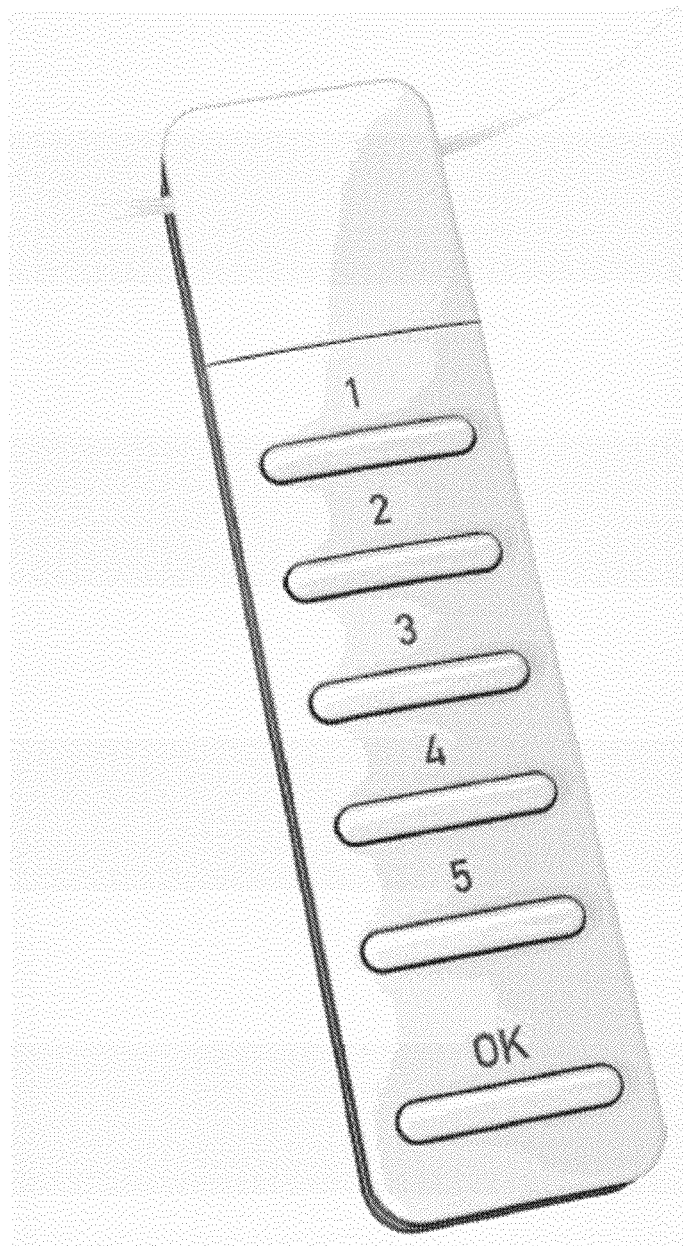

DEVICE AND METHOD FOR IDENTIFICATION AND AUTHENTICATION

CROSS REFERENCE TO RELATED APPLICATIONS

This application is a continuation of U.S. application Ser. No. 12/669,929 filed Jan. 20, 2010, which is a National Phase filing under 35 U.S.C. 371 of PCT/EP 2007/053966 filed Apr. 23, 2007, which claims priority to U.S. provisional Application No. 60/745,432, filed Apr. 24, 2006, U.S. provisional Application No. 60/746,915, filed on May 10, 2006, and U.S. provisional Application No. 60/806,299, filed on Jun. 30, 2006 The entire contents of each of the above-applications are incorporated herein by reference.

BACKGROUND

Recent year's evolution of the Internet has exposed the fact that dependable identification is the foundation for reliable network-based services. As simply providing an identity, such as a customer number or a user name is not enough from a security viewpoint, additional means of authentication must be added to ensure that identities are not misused or spread in an uncontrollable manner. Traditional methods of supplying a username and a secret password, known as static authentication, is nowadays known to be a too weak method of authenticating a remote user as the method is just "static". Eavesdropping and other means of intercepting the username-password pair immediately gains access to the service and there is no real way to determine that the identity has been compromised. Very basic means of having the user to reveal its username-password pair is known as "Phishing", where a seemingly genuine message from the service owner asks the user to supply its username and password to a bogus site is surprisingly effective. Other means of "Social Engineering" and the simple reality that username-password pairs can by a high degree of certainty be guessed or broken by "Brute force" methods.

In order to address the issues with static authentication, several schemes of dynamic authentication have been developed, including several means requiring an external "token", i.e., a small portable card, key-fob or other device which is capable of generating "passwords" that change every time they are used, i.e. replacing a. static scheme with a dynamic one.

There is also a common understanding today recognizing that what is known as "Two factor authentication" is an effective way to increase the strength of the identification process as the user must Have something physical and also know a secret to conduct a transaction. The requirement of having a physical device adds another dimension of security as the singularity of an identity can be more easily enforced. If the physical device is lost, the user recognizes it and can request to have the credentials for its current device revoked.

Several means of token-based identification and authentication have been introduced to the marked over the years, where the most known is probably the "Smartcard". By embedding a cryptographic processor and a cryptographic key into a card, a bi-directional process known as challenge-response can be used where the password in a trivial description is made dynamic in a scheme known to the service provider only. This scheme effectively thwarts traditional means of intercepting a static password and later replaying it. As the initial challenge is issued by the service provider and is "scrambled" by the cryptographic processor in the user's token, recording of the response does not make sense as it will not work for subsequent challenges.

Although the Smartcard at first glance seems like the perfect solution for remote identification, it has been shown that it is fairly difficult and expensive to implement in a practical setting. Apart from the cost of the actual hardware and its deployment, the integration issues found on the client-side is often a more challenging problem. Although there is a certain level of conformity in the operating systems and computer hardware in an average user population, the number of permutation and the apparent differences between different systems and versions of hardware and software is very large, Further, integration and interaction between the service and the user's web-browser or client application software is somewhat open to non-standard implementations. Yet further, more or less complicated installation procedures of software drivers is usually required, which by certain percentages restrict users front installing it and by awkwardness limits the attractiveness from a user's point of view. From a cost of deployment and cost of ownership perspective, the largely unknown and uncertain cost and support burdens often scares service owners away from this otherwise attractive solution.

The above described shortcomings and awkwardness Smartcard deployment have created a marked for authentication devices working off-line. By not requiring a direct connection to the client computer, the incompatibility problems can largely be avoided at the expense of more user interaction and a less automated challenge-response scheme. Although several different varieties exist, they generally are capable of creating a dynamic password only, with or without a previous challenge that needs to be entered into the device. As this process is manual by nature, the number of interactions with the device has to be held down to a minimum. Further, as digits needs to be typed in, one by one, the number of digits used in the process needs to be kept at a minimum as well, which in turns requires more complicated processes to be used to reduce the risk of cryptanalysis of intercepted codes being sent. This scheme typically requires a time-variant code which needs to be maintained by the device and the server needs to synchronize this at each authentication event. This in turn puts some requirements of the stability of the device's time base and further requires that the device must have a battery to maintain the time base. Needless to say, this adds additional problems and potential sources of errors.

The usage of biometrics, such as fingerprint scanning, has in recent years been recognized as a convenient and secure method of identification and authentication. However, as the scanned biometric data is no identification per se, typically an additional identification code needs to be supplied so that the biometric data can be matched to a pre-stored biometric template paired with that identification code. It can then be argued that the static nature or the biometric data would make it no more secure than a static password. Further, as there is an overall concern regarding the personal integrity when supplying a biometric template as the biometric data cannot be revoked and will therefore have an unlimited lifetime. In settings where the matching of the biometric data is performed integral in a device and there is only one or a few user for that device, this problem can be avoided. In practical settings, this has been used to gain access to personal items, such as laptop computers and alike. From both a convenience and security perspective, this is a fairly attractive solution as no identification needs to be supplied and the biometric data is stored, scanned and matched in the device itself. This in turn avoids the biometric template to be spread and the stored template can be deleted at any time.

In summary, it would be desirable to have a system which gives a more favorable compromise between the simplicity of the username-password scheme, the security of the Smartcard scheme and the portability of the off-line token scheme, all available at a low overall cost. Further, in certain settings, the convenience and speed of supplying a simple fingerprint without transmitting the biometric template could be desired.

DESCRIPTION OF THE INVENTION

The present invention relates to a device for identification and authentication of a remote user connecting to a service over a network, comprising a cryptographic processor and at least one cryptographic key and storage means, additional processing means and interface means to generate and transmit a static identification part in conjunction with a dynamic part by emulation through a standard input means of a client terminal by explicit command of the device holder.

Typical Internet based services all have a least common denominator of keyboard entry by alphanumeric keystrokes sent in clear text, key by key through a keyboard port. Today's computers typically have a legacy PS/2 port and/or a state-of-the-art USB port, where an external keyboard can be attached. Although the legacy PS/2 keyboard port is somewhat restricted to certain computer hardware it is generally supported by most operating systems. In recent years, there has been conformity in keyboards with a Universal Serial Bus (USB) interface, where a simple key-by-key protocol known as Human Interaction. Device (HID) is used. This conformity together with a general built-in support ("Plug-and-Play") for such devices without the need of additional drivers and/or privileges typically makes attachment of art external keyboard a very simple and painless procedure with a high probability to succeed. Both the PS/2 and USB ports supply power which allows the connected device to be powered from the computer which allows the device to he operated without the need of an additional battery or other power source.

In its basic setting, the present invention features a device connectable to a standard keyboard port, which from the terminal's point of view acts exactly as if it was an external keyboard, i.e. the device perfectly emulates a keyboard and has built-in features to send emulated key codes. By the command of the user, the device can generate a unique sequence of emulated keystrokes, which are sent as a stream to the terminal it is connected to.

In order to protect the device from being used by an unauthorized person, it should provide means of two-factor authentication or other means to restrict usage to the legitimate user only. The state-of-the-art approach would be to provide the device with means for the user to supply a personal and/or confidential piece of authentication information, such as a keypad for entry of a Personal Identification Number (PIN), a joystick for entry of a unique code pattern fingerprint reader, voice recognition or other biometric scanning means. The supplied personal authentication data is then matched on the device with a pre-stored template. If the supplied information matches, the device is being considered to be in the hands of a legitimate user and the identification and authentication sequence is generated. If there is no match, the process is terminated and no information leaves the device.

In order to further simplify the device hardware and to maintain compatibility with legacy username-password systems, the above described keypad could be omitted. By entering a legacy username and password in the appropriate fields, the sequence is completed by pressing a single activation key on the device. The static username and password are thereby appended with a dynamic code generated by the device. Although this scheme would be somewhat a compromise in terms of security as a Trojan Horse could intercept the entered username and password pair, the requirement for the physical device and the additional requirement that the activation needs to he performed manually would make an intercepted username-password pair less useful.

Given that the above described simplified scheme would be accepted from a security standpoint, a yet more simplified (and thereby even less expensive) device could be provided without any activation button at all. The activation would then be performed by using output means provided by the keyboard interface. In order to make this approach as portable as possible, standardized output messages provided by the keyboard driver would then he used, which typically would restrict the implementation to use any of the available indicator codes for the states Caps Lock, Num Lock and/or Scroll Lock, which are available on most standard keyboards. By entering a simple activation sequence which should be selected to be used for activation purposes only as these keys ore reserved for other purposes. A simple scheme could for example imply two consecutive presses en Scroll-Lock. This in turn would send out an indicator update to all attached keyboards. This sequence with Scroll Lock on and Scroll Lock off will be recognized by the authentication device (which again is identified by the computer as a keyboard) and cause the device to release an authentication code sequence. Alternatively, the trigger key sequence can he a secret combination of keys, which is used in place of a PIN-code. The authentication device then intercepts the received sequence of indicator update codes and waits for an expected sequence, known to the device holder only before releasing the authentication code sequence.

The authentication code sequence begins with a unique identifier which identifies the user and is followed with an authentication code in form of an encrypted single-use long number, which is composed of certain fields. The authentication code is designed to be one-way, i.e. only the token can generate it and only the receiving site can decode it and determine if the code is authentic.

In order to thwart phishing attempts and replay attacks, the authentication code includes variant fields that change each time a code is generated. Where one-time-pads often are more or less sensitive to phishing attacks, integral of the invention is to include a non-volatile linear counter (NVC) which is incremented by one the first time the device is used after power-up where at the same time a volatile timer (VT) value is initiated to zero and a third volatile counter (VC) is initiated to zero. Once powered up, the timer counts up with a reasonably stable frequency of around 5 Hz.

Each time a new authentication code is released by the device, the current NVC and the VT values are captured and concatenated with VC, where after VC incremented by one. These three fields together creates a guaranteed unique value which also has the characteristic that a more recent code always is higher than an older one, which as such provides a measure against replay attacks.

Further, within a session, each received authentication code will follow a predictable scheme.

The first released authentication code always has VT and VC values set to zero. Further, the NVC value should be the previously recorded one plus one. When this code is received, a timestamp shall he captured from a system real-time-clock source to a value VS.

The second released authentication code must have its NVC value matching the one at session start. The VC value shall be one. Given that the VT counts up with around 5 Hz (a value which is not critical per se), the value of VT should be reasonably known from the stored value of VS. The ratio between VS and VT will give an indicative means of the actual frequency ratio between the absolute time and the less accurate time generated by VT.

The third released authentication code must have its NVC value matching the one at the session start and the VC value shall be two. The VT value should now be even more reasonably known given $VT_{(\tau-2)}$ and $VT_{(\gamma-1)}$.

The fourth released code should then follow the above described pattern and so on.

Obviously, as the scheme described above relies on the fact that each received authentication code is compared with information from the previous one, it is somewhat sensitive to single codes being unintentionally lost. Given that the user unintentionally releases a code when not being in a session, the VT value would not be zero as expected when first being used. In such a case, the verifying service should inform the user that the scheme is out of sync and if the user thinks there may be a potentially fraudulent situation or if he or she thinks there is a plausible explanation to the discrepancy.

Apart from the above exception, another issue may arise if a user "fiddles" with the device from time to time, thereby affecting the NVC. value between "real" sessions. As a "hole" in either NVC. or VC values could arise as a result of a fraudulent operation, this condition is important to address. Again, the most straight-forward approach is to inform the user that there is a discrepancy. If there is a doubt that a fraudulent/relaying user is fraudulently using an identity, the service provider could always trigger a "resynchronization operation", where the user is requested to respond to certain questions within a random time period. If the user fails to properly respond to this "resynchronization scheme", the user's account may be blocked by the service provider.

Apart from the dynamic codes described above, the code further includes a fixed secret code which is known by the service only. In order to keep the cost of the device down, there should be no particular requirement of having a battery backup and keep a time value maintained in a non-volatile means. Further from a cost perspective, there should be no requirements of having a particular absolute accuracy of a volatile time-keeping means, allowing the device to be manufactured as a single-chip device without the need of an external quartz crystal, which in turn allows it to be integrated into a standard credit-card.

All fields are then concatenated together (and padded with fixed or random bits if desired to make cryptanalysis even more difficult) and is then encrypted with a fixed symmetric encryption key.

The typical usage scenario, independent of keyboard input, will then be as follows:

A1). The user enters the URL of the login page of an Internet service, where the default input focus is in the username field. The username field should be succeeded with a password field. In the proposed scenario, the same page and basic background logic can be used for (legacy-) users that login using a static username and password only.

A2). By entering a correct PIN on the device's keypad or joystick (or in case by the biometric option, by simply placing the finger on the fingerprint scanner on the device), the device sends an emulated keystroke sequence of a pre-stored username, let's say "Alex_2285".

A3). Immediately after, an emulated TAB keystroke is sent by the device, which moves the input focus on ate screen to the password field.

A4). The concatenated fields are all encrypted and converted to an alphanumeric representation (preferably MIME coded Base64 7-bit ASCII or anything similar). A full 128 bit encrypted package would then generate 128⁄6=22 alphanumeric characters, which are all sent by the device as an emulated stream of keystrokes, let's say "ks9Af48auzPrricAuLhjf298"

A5). The entry is then optionally succeeded with an "ENTER." keystroke being sent by the device, which then would apply to the page's default "Login" button, which in turn submits the entered username and password information in the same manner it would have been done in a typical manual login process.

A6). The received username is used to lookup the user in the database, where the fixed secret user code, expected linear counter value and encryption keys are stored.

A7) If the user is found in the database, the received password is decrypted with the symmetric key. When decrypted, the received secret user code is verified with the value stored in the database. If it does not match, the data was not encrypted with the correct key and therefore the transaction is rejected.

A8). Further, the stored secret user code, NYC, VC and VT values are verified as well. Given that the NVC and VC counters are equal to the expected values, the stored values are updated, which then reflects the next expected counter values.

A9). If any of the received counter values are lower than the expected value, the login is rejected as this may be a code replay attempt. If however any of the received counter values are higher than expected, the user may have generated codes that did not succeed or just by playing around. If so, the user can be informed (and potentially warned) that this is the case and be asked if he or she finds this okay (there may be a plausible cause) or if there is a reason to suspect that the identity has been subject to misuse. Given that codes have been pulled out from the device by a potential attacker, these codes will however be automatically invalidated as the linear counter has incremented.

A10). When the personal authentication data (PIN and/or biometrics) is entered and validated and the NVC. is incremented by one, where VC and VT are both initiated to zero. VT then further counts up with approximately 5 Hz, which allows a new and totally unique cede to be generated at any time without any risk of a clash.

A11). The service can now at any time request the user to re-identify itself, where the personal authentication needs to be supplied again where a NVC is generated. However, in order to keep a high level of session integrity security without making it too awkward for the user, a special procedure is provided for periodic "re-authentications". Whenever needed (it could well be at every page), the service can post pages where the input focus is set in an authentication code field. After a successful user authentication (PIN or biometrics), by just pressing a button on the device, a new authentication code is generated and streamed out as emulated keystrokes followed by an ENTER key. Thereby, no additional actions (pressing ENTER on the device rather on the ordinary computer keyboard) are needed to get a significant session security increase.

Although the usage scenario above relates to a device with a PIN- or joystick to supply a secret personal identification code, several benefits could be achieved by a device with biometrics input means, such as a small embedded fingerprint scanner. The traditional shortcomings of biometric authentication can here be avoided as the fingerprint template will be scanned by the device stored in the device and matched in the device, all integrated without any possibility to retrieve or change the stored template. As the fingerprint is used on one single device only, a stricter matching can be done as no compensation for different readers needs to be performed.

In addition, traditional skepticism towards biometrics from a personal integrity perspective could be avoided. if a device is lost or an account is revoked, there should be no fear that anyone could misuse or spread the device holder's biometric template.

Further, recent years development in low-cost fingerprint scanning sensors could make this a cost efficient solution as well.

The basic steps in the fingerprint scenario would then be as (simplified from the PIN based entry described above):

B1). The user positions the input focus on the username field.

B2). The user puts or sweeps its finger on the fingerprint scanner of the fob inserted in the USB port.

B3). The scanned fingerprint is compared with the stored template. If the templates match, the username and generated one-time codes are sent by emulated keystrokes.

In summary, the above described biometric scenario could be reviewed as a way to make biometric data. "unique on a per-service basis, dynamic and revokeable".

In a simplified setting, the device can be made to include a single button only. A use scenario could the be as:

C1). The user manually enters its username in the username field

C2). The user enters its password in the password field

C3). The user presses the key on the device and thereby yields a dynamic password which is appended to the previously entered password.

In yet an even mere simplified scenario, the device can be made to not having any button at all. A use scenario can then be as:

D1). The user positions the input focus on the username

D2). The user types in a secret key sequence on the default keyboard using the keys controlling the output indicators Caps Lock, Num Lock and Scroll Lock, let's in this example say Caps-Num-Caps-Scroll.

D3). If the entered sequence matches the reference sequence, the device's stored username and a dynamic access code is yielded by the device, D4). The device sends the appropriate scan codes for Num and Scroll to restore these to the previous state before the sequence was entered.

The device could from a convenience- and customer loyalty perspective provide means of automatically transmitting a URL pre-stored in the device as a stream of emulated keystrokes. The user would then just need to start its browser and press a "connect" key, which then transmits the tall and an ENTER keystroke. Alternatively, this could be made to incorporate the initial identification and authentication stage as well. In such a setting, the initial identification and authentication codes would be sent as parameters to the initial URL, e.g. http://www.acme.co./logub,gtnk?id=Alex_2285?auth=ks9Af48auzPmc AuLhjf298.

Recent years growing popularity of keychain USB memory stick devices gives that a value-added benefit could be to further integrate a memory bank as well. The device would then act as a "composite" device, both emulating a Mass Storage Device and a keyboard device. Given a setting where the device has a keypad, a single key or a biometric scanner, these can be used to unlock a normally disabled memory. Depending on the access code given, read and/or write protection can be locked and unlocked by command of the device holder.

In certain settings, it may be beneficial to supply a device that can be used for identification and authentication to more than one service. In such a setting, a device could be supplied with different usernames, codes and keys, all targeting different services. Depending on which personal identification data that was specified, the device determines which service to use. In the case of a device with biometric scanning, a set of keys can he used to select which service that the user wants to identify and authenticate itself to. Such a device could be pre-programmed by a third-party trusted source to hold, say ten different usernames, keys and codes for ten different services. Such devices having a pre-printed device issuer code (which could be an URL) printed on them could then be sold over the counter to users, who themselves sign up for the services they want to use. As a part of the registration service, the user enters the printed issuer code in a field of the registration form and moves to the field of username and password, selects the intended service number and enters the PIN (or biometrics). The service can then use the issuer code to automatically retrieve the appropriate secret code and encryption key for the selected service number.

Further, the he aspects of the present invention could be used to transmit any type of one-way information from a device held by a user to a centralized service over a network, such as an intelligent pharmaceutical packaging as described in U.S. Pat. No. 6,244,462. In such a setting additional collected data could be converted to a character stream and be sent as emulated keystrokes, thereby allowing such a device to be used with any computer, independent of brand or installed browser and further without any requirements to install any client software.

As the invention would rely on a pure one-way transmission throng keyboard emulation, an additional battery and a display would allow the device to be used in scenarios where a keyboard port is not available, where information then would be read from the screen and transferred to the terminal (or through telephone) by "manual- or verbal means". However, in such a setting the device could not possibly yield the hill security, as the number of digits that is to be read from the display must be very limited from a practical viewpoint.

A value-added benefit for certain types of services would be the requirement of repeating human interaction, where "bots", i.e. computers acting as humans on network services. From a practical viewpoint, whereas entering a key on terminal A or B is of little obfuscation from a real human's point of view, "bot" can obviously not physically push buttons on an external device. For group gaming sites, such as poker, this could be a real benefit, as apart from the imminent security problems, "bots" poses another plague which can be addressed with the features of the present invention.

Although not central to the present innovation, personalization of manufactured devices will be a key issue in the overall feasibility and total cost of a system deployment. In the personalization phase, open (user id) and secret information (encryption key and secret user id) is transferred to the device before being deployed to the user. A typical approach would be to insert the device into an USB port and write the data in a secure and confined environment. However, this may require a tedious and slow manual process and given that devices may be packed in wrapping or other form of packaging a different option would be to have a short-range telemetry interface, where information could be exchanged with the devices from a configuration utility. A potentially suitable way could be to fit the devices with a Radio Frequency Identification (RFID) antenna to allow them to be configured in bulk using state-of-the-art equipment. Such an approach would yield the additional benefit that the devices could be used as RFID tokens as well, suitable far applications like access control etc.

It is however always important to keep the initialization process in a confined and secured environment as secret information is transmitted in clear text by this single maneuver. Preferably, the key and code generation should be generated in the same system as the system being used to verify the access code. By security means, a "closed appliance", i.e. a device which cannot be controlled or interrogated from the outside is preferred.

From an international perspective, the wide variety of national keyboard layouts poses somewhat of a challenge from a deployment point of view. Given that an authentication device is supposed to transmit a MIME/Base64 coded message, the nature of an USB keyboard that transmits "scan codes" rather than characters. If for example a device configured as a United States keyboard layout would be used on a computer in Germany, certain transmitted keystrokes would be interpreted incorrectly, thereby yielding a gibberish code. However, several measures can he taken to address this issue;

E1). The coding scheme can be changed to use characters that are common to most keyboard layouts. Where a hexadecimal coded scheme would yield characters 0.9 and a.f., a modified scheme could use the characters "bdefghijklnrtuv" and one additional character in place of 0.f.

E2). As a prefix to the dynamic password being sent, the device may send a known series of scan codes. The receiving application can then examine these received "reference codes" to determine which current keyboard layout is used.

E3). A more sophisticated host application could implement a "guesswork" scheme, where a code that is rejected can be tried using one of several known and common key mappings. An authentication device yielding characters according to a United States keyboard scheme could by a French site be translated by "guesswork", where a list of known keyboard mappings are tried by translation if the initial verification fails.

Given that the authentication scheme relies on the fact that a changing set of codes needs to be verified against a central database, the scheme limits itself by practical means to be a one-to-one relationship only, several different sites cannot independently verify a received authentication code. By introducing a centralized arbitrator, which maintains the NVC, VC and VT values as well as the asymmetric key, the scheme can be extended to a one-to-many relationship as well. The central arbitrator would then keep track of individual identities and keys and make appropriate translations for requesting services. In a preferred setting, each site can apply to make a one-to-one mapping between a legacy username and password pair and a generated authentication code. The arbitrator could then make the appropriate translation between a verified authentication code and the requesting site's legacy username and password, The protocol between the requesting site and the arbitrator could then use PKI schemes to encrypt and sign requests being transmitted.

In settings where the device is also used in conjunction with a known client computer application in a known IT environment, the device can further be designed to allow the authentication code to be triggered and retrieved by means of a software driver. The benefit in such a setting would be that the authentication operation can be done by direct- and automatic command of the application itself. It is however important that such a setting is designed to prevent a Trojan from fraudulently retrieving authentication codes from the device. One way of securing the device in this setting can be to use a PIN in order to gain access to the device in a similar way that is performed with traditional Smart Cards. An authentication device with a keypad, a single key or biometric scanner could use these means to have the user to "approve" a requested operation.

The device can further be designed to allow a two-way scheme, such as challenge-response. A server issued challenge is then transferred through the client application and through a driver to the device, which in turn creates a response based on the challenge which is then sent back to the server application.

Although this scheme can be said to be known per se, this optional extension for the present invention can allow the authentication device to be used in a wider variety of settings. By using the standard HID protocol by the means of feature reports, the keyboard emulation feature can be used as well and no specific resident client driver needs to be installed in the computer.

In summary, the present invention describes a device and method to conveniently and securely identify and authenticate a user to a service in a network at a very low cost, even from a total cost of ownership perspective. By providing uniquely generated scrambled codes, a higher level of security can be yielded for all state-of-the-art computers, independent of brand, operating system or Internet browser, without the need to install any client computer drivers or other software components. An additional level of security is provided by the possibility to quickly and automatically provide new authentication codes by a keystroke. Services can therefore increase the number of times authentication will be requested without adding any significant obstacle for the user.

BRIEF DESCRIPTION OF THE DRAWINGS

FIG. 1 is an example of a possible embodiment of a device according to the invention.

DESCRIPTION OF THE PREFERRED EMBODIMENT

The preferred embodiment describes an identification card with authentication capabilities in the size and shape of a credit-card having an integrated keypad such as described in U.S. Pat. No. 6,616,035.

Said card is designed to be used together with a card reader with the capability to connect to a standard computer device and perform emulation to act as an external keyboard from said computer's point of view. Said reader may either provide emulation means of a standard PS2- or USB-keyboard or both. This approach would allow the reader to be connected to almost any today existing personal computer, independent of brand, operating system or Internet browser, Further, said card has functionality to generate a unique authentication code on the command of the card holder together with a username in clear text, said username and authentication code being used in an identification and authentication procedure to a service over a network.

The authentication code includes the following fields: (The supplied field sizes in bits are for illustrational purposes only)

a. Session identification counter (16 bits)

This fields contains a linear counter which is incremented when the first authentication code is yielded after power up.

b. Session counter (8 bits)

The session counter is a volatile value that is initialized to zero at the first usage after power-up. Each time a new authentication code is yielded, this value is incremented by one.

c. Timestamp (24 bits)

The timestamp is a linear counter which is initiated to zero when the session identifier is incremented. The counter is incremented by a fixed frequency of approximately 5 Hz to allow unique codes to be generated at any time.

d. Secret user identity (48 bits)

This is just a fixed value which together with the encryption key gives the ultimate uniqueness of each authentication code. Alternatively, this field could be replaced with a fixed number that is not unique to each device. The authentication then relies on the strength of the encryption only.

e. Random number (16 bits)

This additional "means of stochastic" adds some additional measures against cryptanalysis, which alternatively could be implemented by the means of a hash of the fields above if a random source is not available,.

f. Checksum (16 bits)

This code would yield checksum of the codes above. If any data is invalid or an invalid encryption key is used, this checksum would not match. The checksum does not need to be cryptographically safe, as it is only a means for the service to determine if the received and decrypted information is correct. Further, together with the time variant codes above, this also adds some additional "means of stochastic".

The session identifier and timestamp fields ensure that all generated codes are absolutely unique for a given secret user identity. Preferably, the receiving service should keep track of these two values in order to thwart any attempt of replay and/or phishing.

The fields concatenated yields in total 128 bits. Prior to being sent, the 128-bit package is encrypted with a stored 128 bits symmetric encryption key and is then converted to an alphanumeric format to allow it to be transferred as clear text accepted by all systems. A good candidate is the widely used MIME or Base64 encoding scheme, where 6 bits of data is packed into 7-bit ASCII characters. A 128-bit ciphertext can then be converted into 128/6=22 alphanumeric characters.

Alternatively, in order to make the scheme more internationalized, a hexadecimal coding scheme can be utilized. Each 8 bit value is converted to two keystrokes and instead of the traditional coding 0..9 and a..f, the sixteen combinations for each nibble is translated to keystrokes that are more or less common to all keyboard layouts. Such keys are "bdefghijkl-nrtuv", where an additional wild-card is needed.

Although the present invention does not rely on a particular encryption scheme, key length nor the exact disposition and length of the individual fields, a good candidate is a 128 bit plaintext encrypted with the 128-bits. Advanced Encryption Standard (AES) due to its acknowledged strength, high processing speed and small footprint. Shorter key length or longer fields can easily be implemented by having a block cipher scheme.

The intended device usage is when a reliable provider issues devices to, users (which by definition are unreliable). However, in a scenario where there is a mutual level of non-trust and a non-repudiation problem could arise as a consequence of the symmetric scheme used above, asymmetric encryption could be used. In such a case, the device should have the ability to generate a key pair by its own and further have means to protect the private key from being retrieved from the device in any format whatsoever. In such an asymmetric implementation, there should be a means for the service provider to retrieve the public key and a non-repudiation conflict could therefore always be resolved in court.

The device could be adapted to allow the PIN to be changed at any time, where a common method would require the user to supply the old PIN and then enter the new one and finally confirm it. As the device does not include any visual feedback, a practical way could be that information about the progress is displayed in clear text by sending emulated keystrokes. A typical procedure may be as:

F1). The user presses OK and holds the key for three seconds.

F2). The device sends out the text "Change PIN-supply old PIN" in clear text through emulated keystrokes.

F3). As the user enters the PIN on the device, the device sends "*" in clear text.

F4). If the supplied PIN is correct, the text "Supply new PIN" is sent.

F5). After being entered, the text "Confirm new PIN" is sent.

F6). When the new PIN has been entered and verified, the new PIN is stored to replace the old.

It should be apparent that the preferred embodiment does not limit the actual implementation, design or physical appearance of the described identification and authentication device. In very low-cost applications, it could for example be desirable to combine the functionality of the above described card with the functionality of the above described reader into a single unit. An appreciated and widely accepted form factor is something that fits into a keychain. Such a device could physically have the appearance of a commonly available e "fob" or "USB memory stick", i.e. a small device that fits directly into is USB port of a computer. In cases where the USB port of the computer is not conveniently located, an external extension cord could be provided. Although this particular device embodiment could be fitted with a keypad for entry of a PIN, it may be more practical to incorporate a small joystick or similar, where the user can enter a secret code by clicking in a given pattern, known by the user only.

Another option for the fob design could be to integrate a small fingerprint scanner integrated on the device (which would be less practical to use in a card embodiment). In such a setting, the PIN entry is replaced with the user simply placing its finger (or sweeping its finger over) a fingerprint scanner. The fingerprint scan is then matched with a pre-stored fingerprint template which is stored on the fob. In order to maintain the user's personal integrity, the device should be designed to have a one-way function, i.e. the fingerprint template could only be assigned and never retrieved from the device. By a special sequence, the device could be paired with a new fingerprint template, where a hidden switch is activated (with the top of a pen for example). The user would then have to place its finger on the scanner to retrieve several scans. If the new template is accepted, all previous codes and keys are deleted.

Independent on the physical appearance, the preferred embodiment could include a method of selecting between a plurality of pre-stored service usernames, secret codes and encryption keys. In such a setting, the device can be supplied from a trusted party, which business model relies in supplying identification and authentication devices with a number of pre-stored codes and keys in them. At the time of manufacturing, it will not be known for which services the device is going to be used. The user then purchases the devices and for each service the user signs up for, it supplies a code and a password in clear text (one for each service) accompanying the device to the service provider. The service provider can then require the trusted party to supply the secret key and user identification codes.

In a different embodiment, a traditional Smartcard and reader may be used where that Smartcard reader would have a keyboard interface rather than the conventional ISO7816 protocol implementation. For increased security and two factor authentication support, the Smartcard should have a keypad. Again, when attached as a peripheral to a computer, the computer will detect the reader as a conventional keyboard (although it is a Smartcard reader). When the card is inserted and the PIN is entered, the Smartcard reader then transmits emulated keystrokes to the computer.

Conversely, in other setups it may be more convenient to have a short-range radio link between the device and a radio receiver connected to the host computer, just like conventional wireless keyboards. Such short-range radio links can be implemented at a very low cost, given the wide availability of wireless keyboards and mice. Further, a broader acceptance can be expected by adoption of initiatives such as "Wireless USB". However, such an authentication device would require a battery as power cannot be efficiently provided with such radio links.

Alternatively, a wireless setting can be implemented with a host-powered telemetry solution, such as RFID, where a strong Radio Frequency (RF) field is emitted by a transceiver. The portable device can then be powered by the transceiver without any need for a battery in the device. This will, however limit the usable range between the transceiver and the portable device.

What is claimed is:

1. A method for generating an output code from a user device, comprising:
   receiving, by the user device, an explicit command to generate the output code;
   generating, by the user device in response to the explicit command, the output code using a cryptographic key, wherein generating the output code comprises:
      comparing an identifier of the holder of the user device with information identifying one or more holders of the user device, the identifier uniquely identifying the holder of the user device;
      responsive to the identifier of the holder of the user device matching the information identifying one or more holders of the user device, indicating that the holder of the user device is verified; and
      responsive to the holder being verified, generating a dynamic authentication code associated with an identifier of the holder of the user device;
      wherein the dynamic authentication code comprises a session identifier, a session counter and a timestamp of a plurality of variant fields, and the dynamic authentication code is variant and unique from other dynamic authentication codes generated by the user device and has characteristics that provide an indicator of potentially fraudulent usage of the user device;
   translating the generated output code into a plurality of emulated keystrokes; and
   outputting the plurality of emulated keystrokes from the user device to an input of a client device.

2. The method of claim 1, wherein the cryptographic key used in generating the output code is stored in the user device and is uniquely associated with the user device.

3. The method of claim 1, further comprising:
   concatenating the identifier with the dynamic authentication code to generate a concatenated code sequence; and
   applying the cryptographic key to the concatenated code sequence to generate an alphanumeric representation as the output code.

4. The method of claim 1, wherein the plurality of variant fields comprise:
   a random number; and
   a checksum indicating whether a valid encryption key is used to generate the dynamic authentication code.

5. The method of claim 1, wherein the identifier identifying the holder of the user device comprises at least one of:
   a personal identification number;
   a combination of user name and password;
   a key sequence comprising a plurality of keystrokes of a keyboard;
   a fingerprint of the holder of the device;
   a sample of voice of the holder of the device; and
   a sample of biometric scanning data from the holder of the device.

6. The method of claim 1, further comprising:
   intercepting an output message comprising a plurality of keystrokes entered by the holder of the user device on a keyboard in communication with the user device; and
   using the intercepted output message as the identifier of the holder.

7. A user device for providing an output code, comprising:
   a computer processor for executing computer program modules; and
   a non-transitory computer readable storage device storing computer program modules executable to perform steps comprising:
      receiving an explicit command to generate the output code;
      generating, in response to the explicit command, the output code using a cryptographic key, wherein generating the output code comprises:
         comparing an identifier of the holder of the user device with information identifying one or more holders of the user device, the identifier uniquely identifying the holder of the user device;
         responsive to the identifier of the holder of the user device matching the information identifying one or more holders of the user device, indicating that the holder of the user device is verified; and
         responsive to the holder being verified, generating a dynamic authentication code associated with an identifier of the holder of the user device;
         wherein the dynamic authentication code comprises a session identifier, a session counter and a timestamp of a plurality of variant fields, and the dynamic authentication code is variant and unique from other dynamic authentication codes generated by the user device and has characteristics that provide an indicator of potentially fraudulent usage of the user device;
      translating the generated output code into a plurality of emulated keystrokes; and
      outputting the plurality of emulated keystrokes from the user device to an input of a client device.

8. The device of claim 7, wherein the cryptographic key used in generating the output code is stored in the user device and is uniquely associated with the user device.

9. The device of claim 7, further comprising executable computer program modules for:
   concatenating the identifier with the dynamic authentication code to generate a concatenated code sequence; and applying the cryptographic key to the concatenated code sequence to generate an alphanumeric representation as the output code.

10. The device of claim 7, wherein the plurality of variant fields comprise:
   a random number; and
   a checksum indicating whether a valid encryption key is used to generate the dynamic authentication code.

11. The device of claim 7, wherein the identifier identifying the holder of the user device comprises at least one of:
   a personal identification number;
   a combination of user name and password;
   a key sequence comprising a plurality of keystrokes of a keyboard;
   a fingerprint of the holder of the device;
   a sample of voice of the holder of the device; and
   a sample of biometric scanning data from the holder of the device.

12. The method of claim 1, wherein the information identifying one or more holders of the user device is stored in a pre-determined template.

13. The method of claim 12, wherein the pre-determined template is a pre-stored fingerprint template stored on the user device and the information stored on the user device identifying a holder of the user device is based on a fingerprint associated with the holder of the user device.

14. The device of claim 7, wherein the information identifying one or more holders of the user device is stored in a pre-determined template.

15. The device of claim 14, wherein the pre-determined template is a pre-stored fingerprint template stored on the user device and the information stored on the user device identifying a holder of the user device based on a fingerprint associated with the holder of the user device.

16. A non-transitory computer readable storage device storing computer program modules executable to perform steps comprising:
   receiving an explicit command to generate an output code;
   generating, in response to the explicit command, the output code using a cryptographic key, wherein generating the output code comprises:
      comparing an identifier of the holder of the user device with information identifying one or more holders of the user device, the identifier uniquely identifying the holder of the user device;
      responsive to the identifier of the holder of the user device matching the information identifying one or more holders of the user device, indicating that the holder of the user device is verified; and
      responsive to the holder being verified, generating a dynamic authentication code associated with an identifier of the holder of the user device;
      wherein the dynamic authentication code comprises a session identifier, a session counter and a timestamp of a plurality of variant fields, and the dynamic authentication code is variant and unique from other dynamic authentication codes generated by the user device and has characteristics that provide an indicator of potentially fraudulent usage of the user device;
   translating the generated output code into a plurality of emulated keystrokes; and
   outputting the plurality of emulated keystrokes from the user device to an input of a client device.

* * * * *